(12) United States Patent
Van der Waal et al.

(10) Patent No.: US 11,457,639 B2
(45) Date of Patent: Oct. 4, 2022

(54) DESKINNING APPARATUS AND METHOD FOR DESKINNING A POULTRY LEG OR PART OF A POULTRY LEG

(71) Applicant: Meyn Food Processing Technology B.V., Oostzaan (NL)

(72) Inventors: Dirk Hermen Van der Waal, Oostzaan (NL); Peter Martin Andeweg, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 17/077,303

(22) Filed: Oct. 22, 2020

(65) Prior Publication Data

US 2021/0120829 A1     Apr. 29, 2021

(30) Foreign Application Priority Data

Oct. 23, 2019   (NL) ...................................... 2024085

(51) Int. Cl.
   *A22C 21/00*         (2006.01)
(52) U.S. Cl.
   CPC ...... *A22C 21/0092* (2013.01); *A22C 21/0007* (2013.01); *A22C 21/0053* (2013.01)
(58) Field of Classification Search
   None
   See application file for complete search history.

(56) References Cited

U.S. PATENT DOCUMENTS

| | | | |
|---|---|---|---|
| 2003/0008606 A1 | 1/2003 | Hazenbroek et al. | |
| 2009/0170417 A1* | 7/2009 | Janssen | A22C 21/0023 452/136 |
| 2014/0120815 A1* | 5/2014 | Stooker | A22C 21/0076 452/125 |
| 2014/0120816 A1* | 5/2014 | Stooker | A22C 21/0092 452/128 |
| 2016/0270413 A1* | 9/2016 | Bos | A22C 21/0092 |
| 2019/0142021 A1* | 5/2019 | Van Hillo | A22C 21/0053 452/128 |
| 2021/0120829 A1* | 4/2021 | Van Der Waal | A22C 21/0007 |

FOREIGN PATENT DOCUMENTS

| | | |
|---|---|---|
| EP | 0519570 A1 | 12/1992 |
| EP | 3068229 B1 | 9/2016 |
| EP | 3485735 A1 | 5/2019 |
| NZ | 581870 A | 5/2011 |

OTHER PUBLICATIONS

Netherlands PCT International Search Report Corresponding to PCT/NL2014/050779, Application 2024085 dated Oct. 23, 2019, 10 Pages.
Translation of Japanese Office Action Corresponding to Application No. 2020177019 dated Nov. 17, 2021.

* cited by examiner

*Primary Examiner* — Richard T Price, Jr.
(74) *Attorney, Agent, or Firm* — Dority & Manning, P.A.

(57) ABSTRACT

Deskinning apparatus for a poultry leg or part of a poultry leg, including a conveyor with conveyor hooks from which the poultry leg or part of the poultry leg is suspendable, and rollers below the conveyor that are rotatable in opposite directions and are provided with meshing teeth that are contactable with a skin on the poultry leg or part of the poultry leg that is suspended from the conveyor hooks for stripping the skin from the poultry leg or part of the poultry leg, wherein the rollers are movable up and down.

21 Claims, 5 Drawing Sheets

DESKINNING APPARATUS AND METHOD FOR DESKINNING A POULTRY LEG OR PART OF A POULTRY LEG

FIELD OF THE INVENTION

The subject matter of the present disclosure relates generally to a method and an apparatus for deskinning a poultry leg or part of a poultry leg.

BACKGROUND OF THE INVENTION

A method and apparatus is known from EP-A-3 485 735, which employs a set of top rollers above a set of bottom rollers for contacting opposite sides of the poultry leg or part of the poultry leg. The rollers are oriented horizontally. Another example is known from EP-A-3 068 229, which employs a set of rollers arranged along the track of a conveyor and adapted to remove the skin from the whole poultry leg. The rollers are oriented vertically.

BRIEF DESCRIPTION OF THE INVENTION

Aspects and advantages of the invention will be set forth in part in the following description, or may be obvious from the description, or may be learned through practice of the invention.

In one exemplary aspect, the present invention has as an object to provide a method and apparatus which can be suitably employed at high production rates amounting to approximately 15,000 or more legs per hour, whilst securing a high efficiency of skin removal with a minimal amount of meat attaching to the detached skin. This object can be achieved or at least in part promoted by a method and apparatus embodied with the features of one or more of the appended claims.

The subject matter of the present disclosure relates generally to a method and an apparatus for deskinning a poultry leg or part of a poultry leg. In one exemplary embodiment, the present invention may include a conveyor with conveyor hooks from which the poultry leg or part of the poultry leg is suspendable, and rollers below the conveyor that are rotatable in opposite directions and are provided with meshing teeth that are engageable with a skin on the poultry leg or part of the poultry leg that is suspended from the conveyor hooks for stripping the skin from the poultry leg or part of the poultry leg. One exemplary aspect of the invention is that the rollers are oriented horizontally and are movable up and down.

In another exemplary aspect, the up-and-down movability of the rollers enables that after the rollers have engaged the skin on the poultry leg or part of the poultry leg for gripping the skin on the poultry leg or part of the poultry leg, the rollers can be moved upwards so as to arrange that the skin on the poultry leg or part of the poultry leg is torn loose from the poultry leg or part of the poultry leg. For gripping the skin of the poultry leg the rollers can be arranged to rotate and engage the skin of the poultry leg. For this embodiment, the rollers are arranged to rotate with their meshing teeth moving towards each other as seen at a side where the rollers face the poultry leg or part of the poultry leg.

In another exemplary aspect, the rollers with the meshing teeth are movable upwards from a first position to a second position above the first position, and are arranged such that during use the meshing teeth of the rollers first grip the skin on the poultry leg or part of the poultry leg, and then are moved upwards along the poultry leg or part of the poultry leg that is suspended from the conveyor hooks by the ankles, to pull the skin loose from the poultry leg or part of the poultry leg. After gripping the skin is completed and during the upward movement of the rollers, the rollers can be arranged to stop rotating so as to provide that the rollers maintain to hold the skin during pulling the skin loose from the poultry leg. This facilitates the controlled detachment of the skin from the poultry leg or part of the poultry leg.

In another exemplary aspect, the apparatus is equipped with clamping means for stably positioning the poultry leg during movement of the rollers. The clamping means can be arranged to clamp the poultry leg at a position distant from the conveyor hooks, for instance on the hip bone sticking out from the poultry leg that is suspended by the ankles.

In one exemplary aspect, the rollers are movable in a horizontal plane towards a position wherein during use a poultry leg or part of the poultry leg is suspended so as to initiate operation of the rollers on the poultry leg or part of the poultry leg. In this exemplary embodiment, the rollers are also movable in a horizontal plane away from a position wherein during use a poultry leg or part of the poultry leg is suspended by the ankles so as to finalize operation of the rollers on the poultry leg or part of the poultry leg.

In another exemplary embodiment, the clamping means are movable in a horizontal plane towards a position wherein during use a poultry leg or part of the poultry leg is suspended by the ankles so as to initiate operation of the rollers on the poultry leg or part of the poultry leg. For this exemplary aspect, the clamping means are also movable in a horizontal plane away from a position wherein during use a poultry leg or part of the poultry leg is suspended by the ankles so as to finalize operation of the rollers on the poultry leg or part of the poultry leg.

In another exemplary embodiment, the rollers are equipped to rotate with their meshing teeth moving away from each other at a side where the rollers face the poultry leg or part of the poultry leg when the rollers are disengaged from the poultry leg or part of the poultry leg so as to release the skin and sever the skin from the rollers after it has been pulled loose from the poultry leg or part of the poultry leg.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Whenever in the figures the same reference numerals are applied, these numerals refer to the same parts.

DETAILED DESCRIPTION

Figure 1:
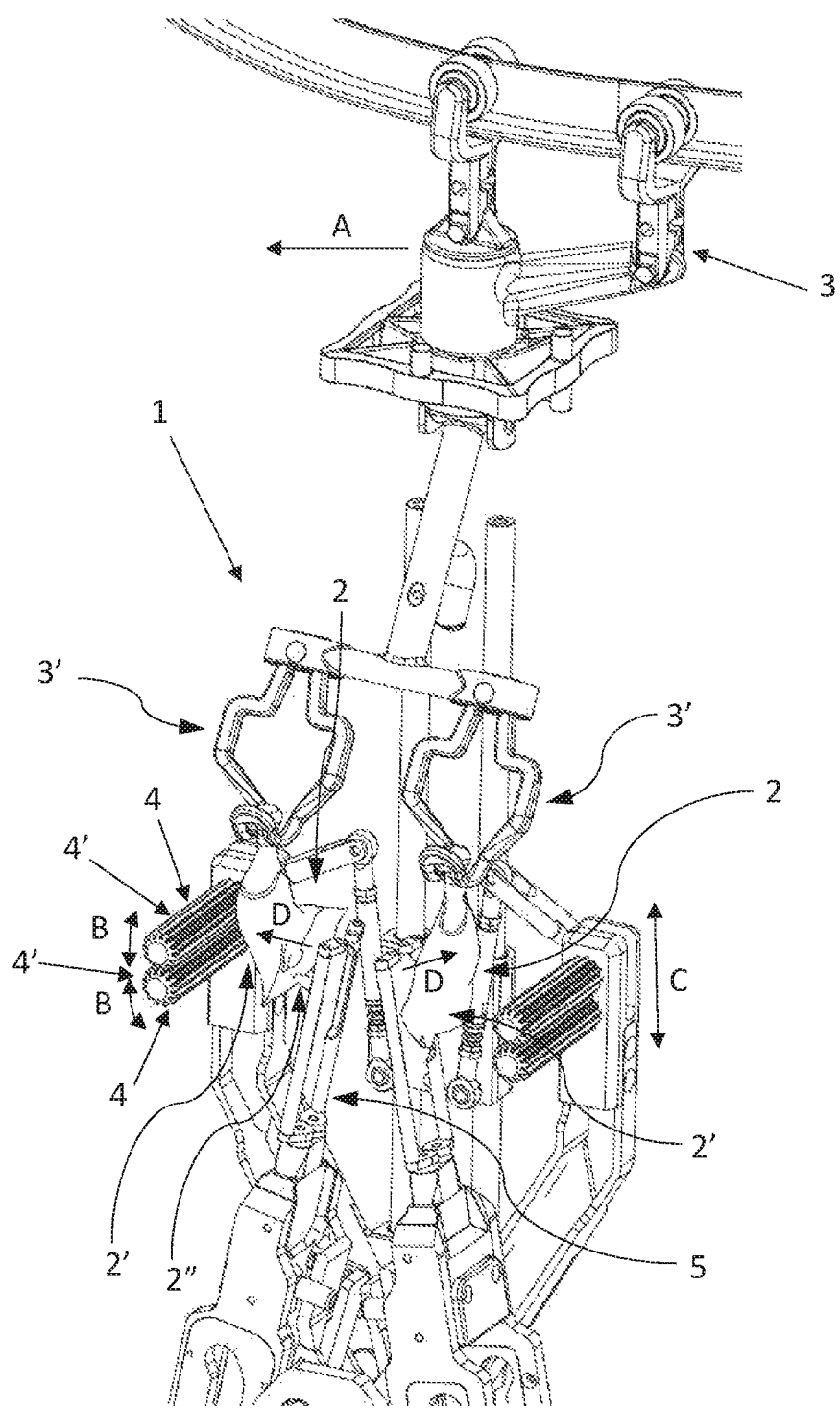
FIG. 1 shows a side view of an exemplary deskinning apparatus of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

With reference first to FIG. 1, a deskinning apparatus 1 according to an exemplary embodiment of the invention is shown which is used for removing the skin 2' of a poultry leg 2. The deskinning apparatus 1 includes a conveyor 3 with conveyor hooks, usually shackles 3', from which the poultry leg 2 or part of the poultry leg is suspended by the ankles. The shackles 3' move in a conveying direction indicated with arrow A along a track wherein, or adjacent to which, the features of the deskinning apparatus 1 of the invention are provided.

As FIG. 1 shows the exemplary deskinning apparatus 1 includes rollers 4 that are employed as a set of two cooperating vertical rollers for deskinning the poultry leg 2 or part of the poultry leg. The rollers 4 are for this purpose equipped with several degrees of freedom. Notably the rollers 4 can rotate clockwise or counter-clockwise as indicated with arrows B, and the rollers 4 are movable up and down according to arrow C. An exemplary option is that the rollers 4 are movable in a horizontal plane to and from a position wherein during use the poultry leg 2 or part of the poultry leg is suspended by the ankles. With this function the rollers 4 may be brought into engagement with the poultry leg 2. It is however also possible that this function of engaging the poultry leg 2 with the rollers 4 is achieved with the operation of clamping means 5, as will be elucidated hereinafter. FIG. 1 further shows that the two rollers 4 have meshing teeth 4' so that the two cooperating rollers 4 always have an opposite rotational direction.

Figure 2:
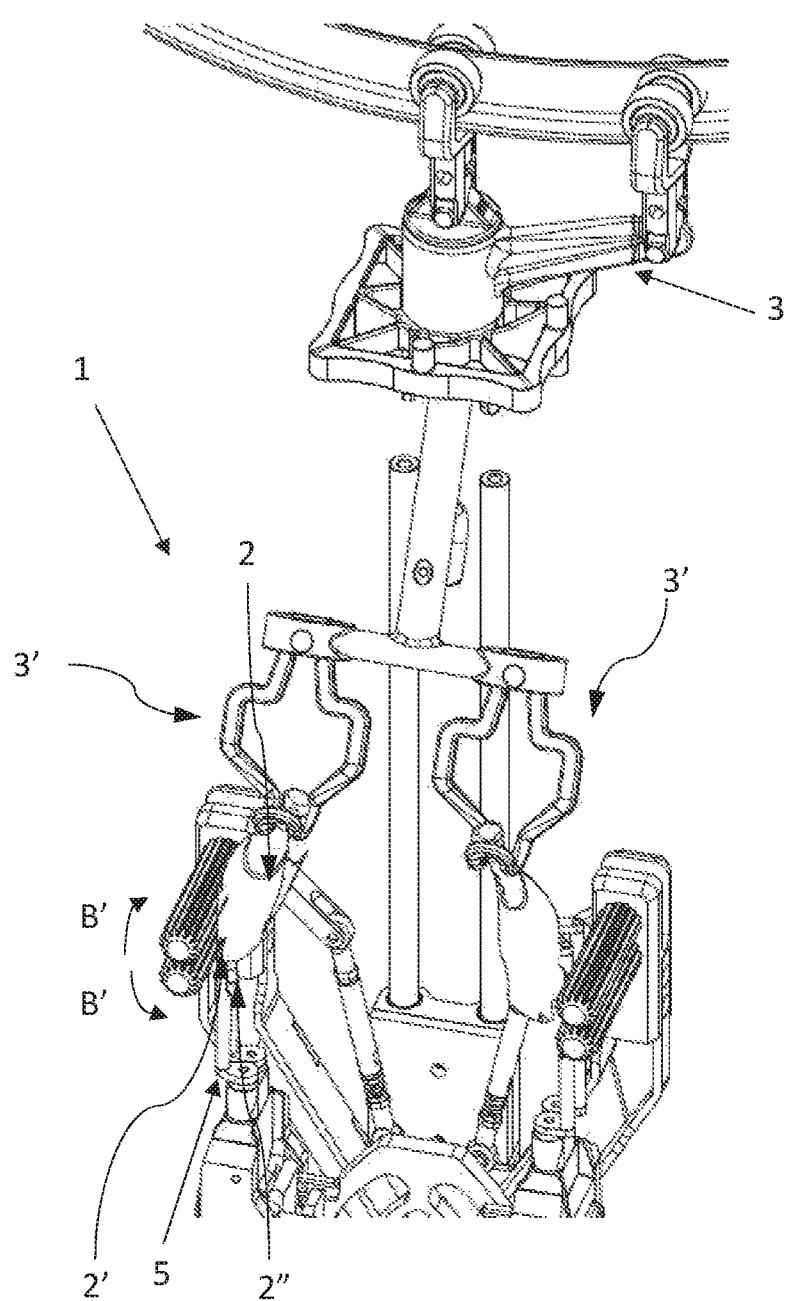
FIG. 2 shows an oblique side view from the right when the rollers of the deskinning apparatus of the invention are in engagement with the suspended poultry legs.
Figure 3:
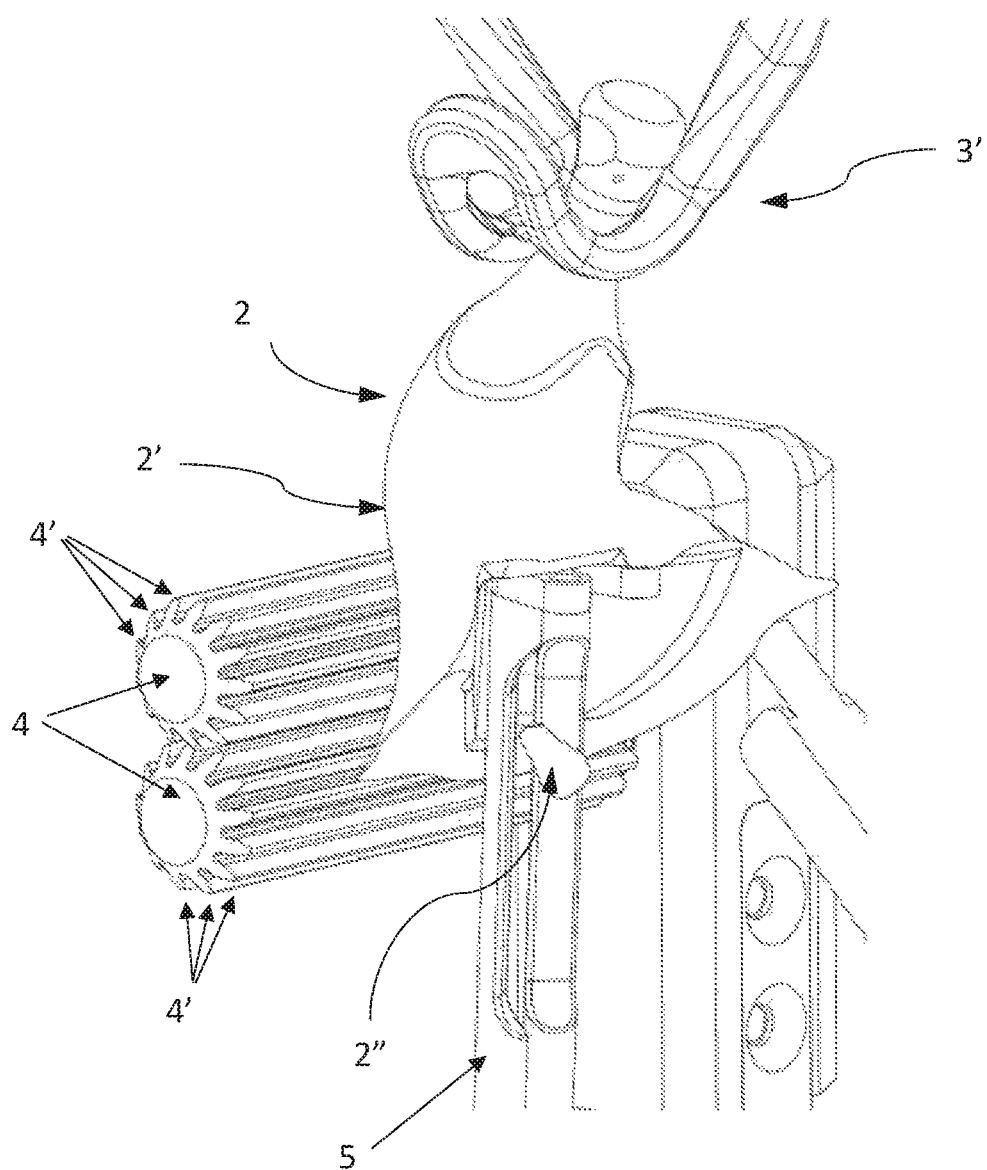
FIG. 3 shows a detail of FIG. 2.
Figure 4:
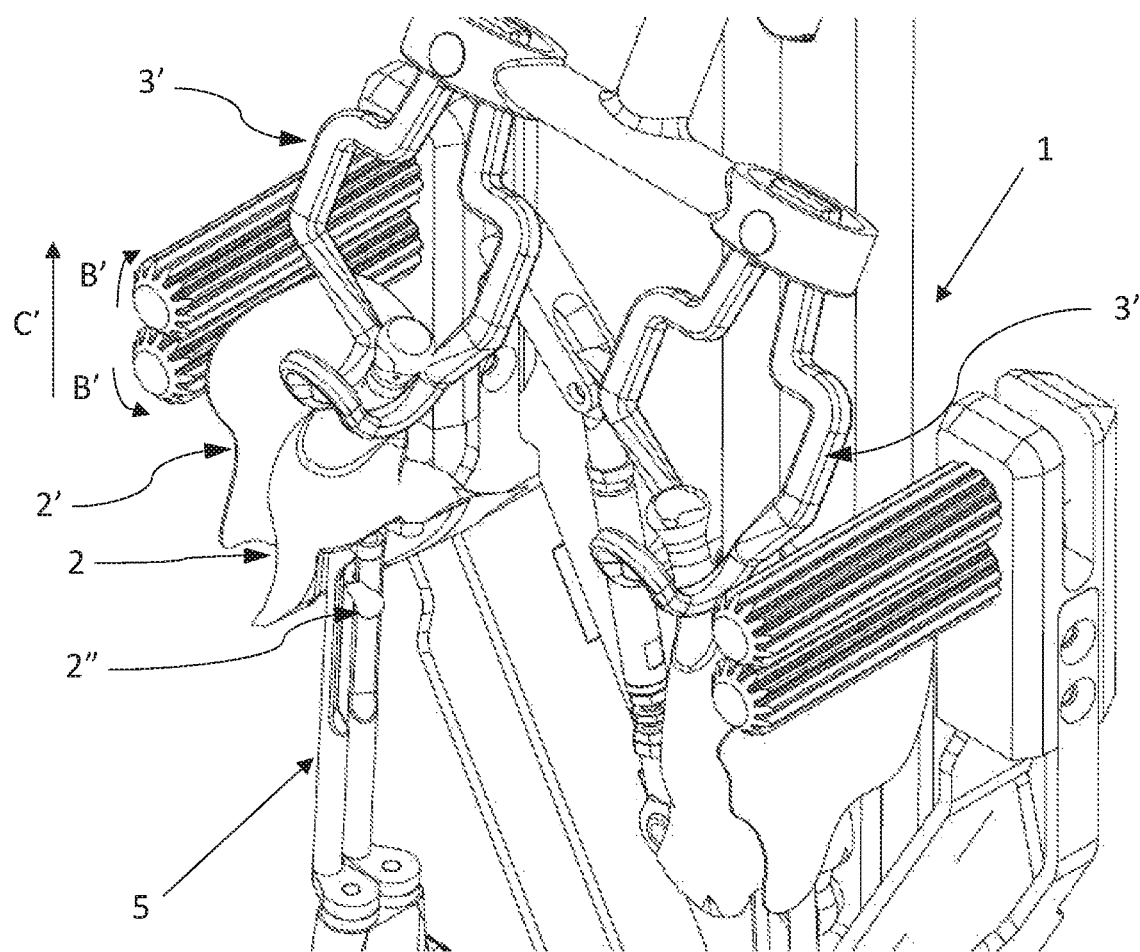
FIG. 4 shows an oblique side view from the right when the rollers of the deskinning apparatus of the invention have moved upwards along the suspended poultry legs.

FIG. 2, and in more detail FIG. 3, shows a situation wherein the clamping means 5 are positioned after completing a horizontal movement according to arrow D shown in FIG. 1 towards the suspended poultry leg 2. The horizontal movement brings the poultry leg 2 into close proximity of the rollers 4 enabling the rollers 4 to engage the skin 2' of the poultry leg 2 and to initiate a gripping operation on the skin 2' of the poultry leg 2. The rotation of the rollers 4 for gripping the skin 2' is symbolized by the arrows B'. After gripping the skin 2' and also during the upward movement thereafter the rollers 4 are arranged to stop rotating. From then on, the rollers 4 merely maintain to hold the skin 2' for pulling the skin 2' loose from the poultry leg 2.

During engagement of the poultry leg 2 and also during the upward movement of the rollers 4, the clamping means 5 clamp the poultry leg 2 at a position 2" which is distant from the shackles 3'. In this example, the poultry leg 2 is clamped at a hip knuckle extending from the meat of the poultry leg 2.

Figure 5:
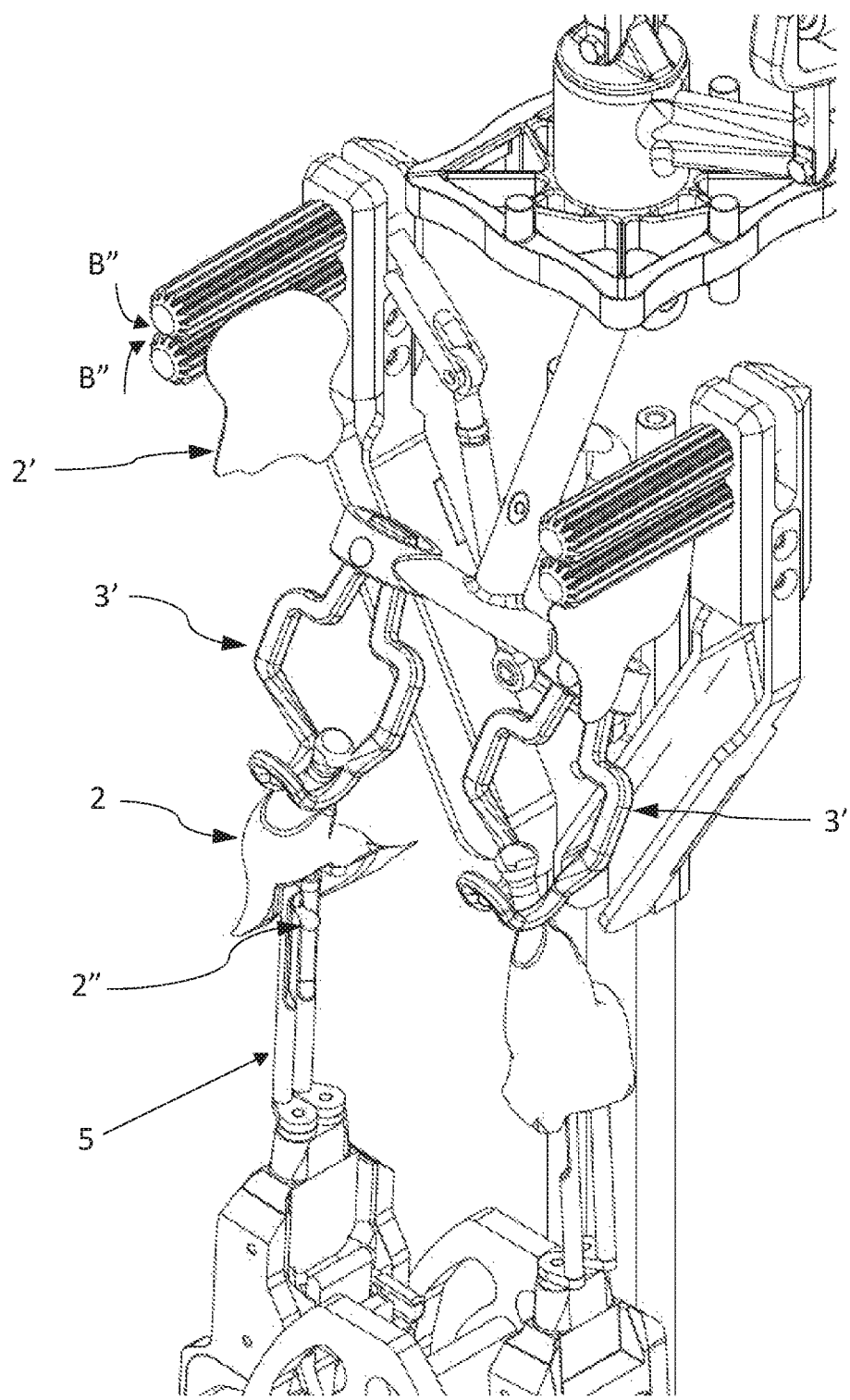
FIG. 5 shows an oblique side view from the right when the rollers of the deskinning apparatus of the invention have torn loose the skin from the suspended poultry legs.

FIG. 5 shows a subsequent situation wherein the skin 2' is completely pulled loose from the poultry leg 2 or part of the poultry leg, and that the rollers 4 are disengaged from the poultry leg 2. At that instance, the rollers 4 can be rotated with their meshing teeth moving away from each other as seen at a side where the rollers 4 face the poultry leg 2 or part of the poultry leg. This releases the skin 2' that has been pulled loose from the poultry leg 2 or part of the poultry leg from the rollers 4. This manner of rotation is symbolized by the arrows B".

Although the invention has been discussed in the foregoing with reference to an exemplary embodiment of the deskinning apparatus of the invention and its method of operation, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A deskinning apparatus for a poultry leg or part of a poultry leg having ankles, comprising:
    a conveyor with shackles from which the poultry leg or part of the poultry leg is suspendable by the ankles;
    rollers below the conveyor that are rotatable in opposite directions and are provided with meshing teeth that are engageable with a skin on the poultry leg or part of the poultry leg that is suspended from the shackles by the ankles for stripping the skin from the poultry leg or part of the poultry leg, wherein the rollers are oriented horizontally and are movable up and down; and
    clamping means for stably positioning the poultry leg during movement of the rollers.

2. The deskinning apparatus according to claim 1, where the rollers with the meshing teeth are movable upwards from a first position to a second position above the first position, and are arranged such that during use the meshing teeth of the rollers first grip the skin on the poultry leg or part of the poultry leg, and then are moved upwards along the poultry leg or part of the poultry leg that is suspended from the shackles by the ankles, to pull the skin loose from the poultry leg or part of the poultry leg.

3. The deskinning apparatus according to claim 2, wherein for gripping the skin of the poultry leg the rollers are arranged to rotate and engage the skin of the poultry leg.

4. The deskinning apparatus according to claim 3, wherein for gripping the skin of the poultry leg the rollers are arranged to rotate with their meshing teeth moving towards each other as viewed from a side where the rollers face the poultry leg or part of the poultry leg.

5. The deskinning apparatus according to claim 1, wherein the rollers are equipped to rotate with their meshing teeth moving away from each other as seen at a side where the rollers face the poultry leg or part of the poultry leg when the rollers are disengaged from the poultry leg or part of the poultry leg, so as to release the skin that has been torn loose from the poultry leg or part of the poultry leg.

6. A processing line for processing poultry comprising a deskinning apparatus according claim 1.

7. The deskinning apparatus according to claim 4, wherein the clamping means are arranged to clamp the poultry leg at a position distant from the shackles.

8. The deskinning apparatus according to claim 7, wherein a selected one of the clamping means and the rollers is movable in a horizontal plane towards a position wherein during use a poultry leg or part of the poultry leg is suspended by the ankles so as to initiate operation of the rollers on the poultry leg or part of the poultry leg.

9. The deskinning apparatus according to claim 4, wherein a selected one of the clamping means and the rollers are movable in a horizontal plane away from a position wherein during use a poultry leg or part of the poultry leg is suspended by the ankles so as to finalize operation of the rollers on the poultry leg or part of the poultry leg.

10. The deskinning apparatus according to claim 9, wherein after gripping the skin and during the upward movement of the rollers, the rollers are arranged to stop rotating so as to provide that the rollers maintain to hold the skin during pulling of the skin from the poultry leg.

11. A method for deskinning a poultry leg or part of a poultry leg, comprising:
conveying the poultry leg or part of the poultry leg while being suspended and held by the ankles;
engaging a skin on the poultry leg or part of the suspended poultry leg with rollers, wherein the rollers have meshing teeth that rotate in opposite directions, wherein the rollers are provided horizontally; and
moving the rollers up and down along the poultry leg being suspended and held by the ankles.

12. The method according to claim 11, further comprising:
moving the rollers upwards so as to arrange that the skin on the poultry leg or part of the poultry leg is pulled loose from the poultry leg or part of the poultry leg;
wherein the moving the rollers upwards occurs after the rollers have engaged the poultry leg or part of the poultry leg for gripping the skin on the poultry leg or part of the poultry leg.

13. The method according to claim 12, further comprising rotating the rollers and having the rollers engage the poultry leg for gripping the skin.

14. The method according to claim 13, further comprising:
arranging that during engagement of the rollers with the poultry leg or part of the poultry leg, the rollers rotate with their meshing teeth moving towards each other at the side where the rollers face the poultry leg or part of the poultry leg.

15. The method according to claim 14, further comprising:
providing that after gripping the skin and during the upward movement of the rollers, the rollers stop rotating so as to arrange that the rollers maintain to hold the skin during pulling the skin loose from the poultry leg.

16. The method according to claim 15, further comprising clamping the poultry leg for stably positioning the poultry leg during deskinning.

17. The method according to claim 16, further comprising clamping the poultry leg at a position distant from the shackles at which the poultry legs are suspended from the ankles.

18. The method according to claim 17, further comprising moving a selected one of the clamping means and the rollers towards a position wherein during use a poultry leg or part of the poultry leg is suspended by the ankles so as to initiate operation of the rollers on the poultry leg or part of the poultry leg.

19. The method according to claim 18, further comprising moving a selected one of the clamping means and the rollers away from a position wherein during use a poultry leg or part of the poultry leg is suspended by the ankles so as to finalize operation of the rollers on the poultry leg or part of the poultry leg.

20. The according to claim 19, further comprising providing that the rollers rotate with their meshing teeth moving away from each other at a side where the rollers face the poultry leg or part of the poultry leg when the rollers are disengaged from the poultry leg or part of the poultry leg, so as to release the skin that has been torn loose from the poultry leg or part of the poultry leg.

21. The method according to claim 20, further comprising disengaging the rollers from the poultry leg and rotating the rollers with their meshing teeth moving away from each other as seen at a side where the rollers face the poultry leg or part of the poultry leg so as to release the skin that has been torn loose from the poultry leg or part of the poultry leg.

\* \* \* \* \*